Figure 1:
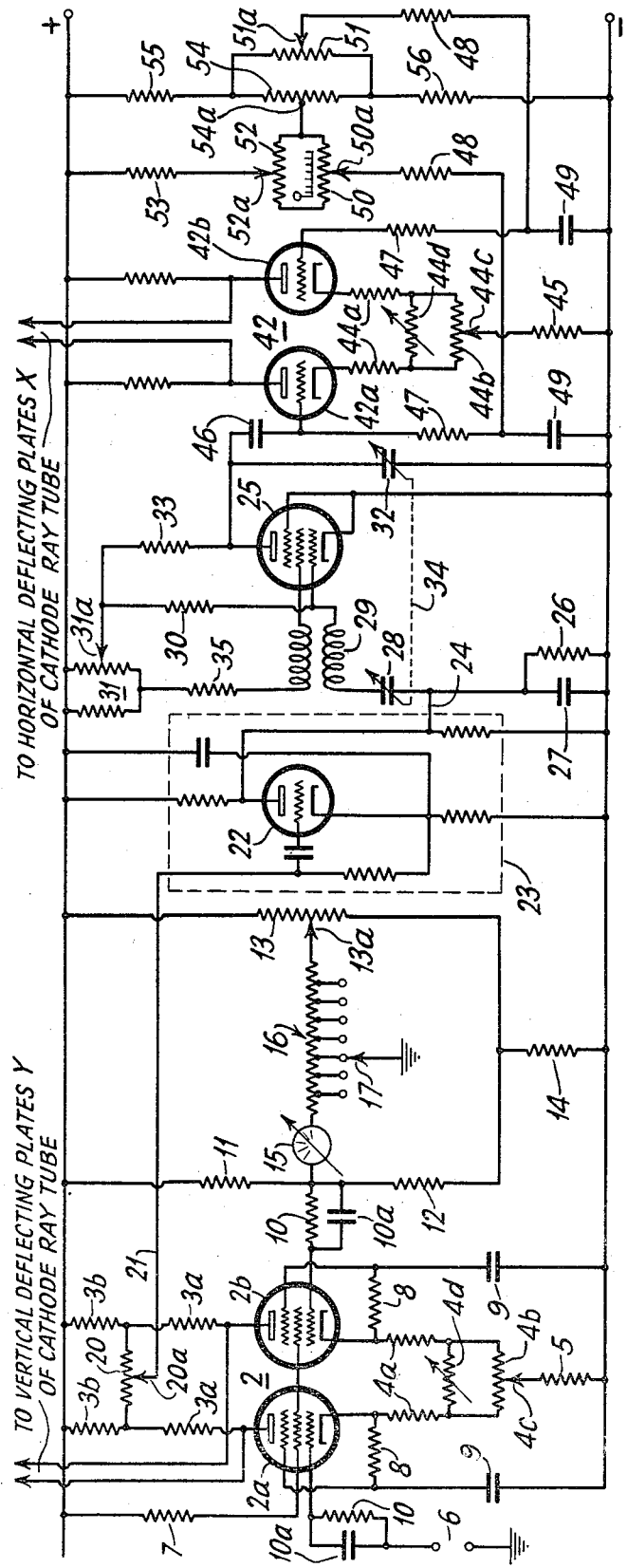

June 16, 1942.    C. O. BROWNE ET AL    2,286,894
CIRCUIT ARRANGEMENT EMBODYING CATHODE RAY OSCILLOGRAPHS
Filed March 22, 1939

CECIL OSWALD BROWNE,
ALAN DOWER BLUMLEIN
AND JOHN HARDWICK
    INVENTORS

ATTORNEY.

Patented June 16, 1942

2,286,894

UNITED STATES PATENT OFFICE 2,286,894

CIRCUIT ARRANGEMENT EMBODYING CATHODE RAY OSCILLOGRAPHS

Cecil Oswald Browne, West Acton, London, Alan Dower Blumlein, Ealing, London, and John Hardwick, West Drayton, England, assignors to Electric & Musical Industries Limited, Hayes, Middlesex, England, a company of Great Britain Application March 22, 1939, Serial No. 263,460
In Great Britain March 23, 1938

8 Claims. (Cl. 171—95)

The present invention relates to electric circuit arrangements using cathode ray oscillographs and relates more especially, though not exclusively, to such arrangements which may be used for investigating wave forms of cyclically varying potentials or currents.

One object of the invention is to provide an arrangement whereby the instantaneous value of a cyclically varying potential or current of high frequency can be measured by a direct reading direct current instrument.

The invention is also applicable to the measurement of the value of a steady potential or current.

In one aspect, the present invention provides a method of measuring a recurrent electrical signal, said method comprising applying said signal to a cathode ray oscillograph in such manner that the wave form of said signal is presented on the screen of said oscillograph with a part of said waveform coincident with a datum line on or associated with said screen, displacing said waveform by the application of a control current or voltage to said oscillograph so as to bring some other part of said wave form into coincidence with said datum line, and measuring said control current or voltage, whereby the amplitude and/or duration of said signal can be determined from the magnitude of said control current or voltage.

Thus apparatus according to the invention may comprise a cathode ray oscillograph, means for applying the potential or current to be measured to said oscillograph so as to cause said oscillograph to afford a trace corresponding to said potential or current, a datum line on or in association with the screen of said oscillograph, means for causing one point on said trace to become coincident with said datum line and for applying a potential or current to cause another point on said trace to become coincident with said datum line, and means for measuring said potential or current which causes said trace to shift to afford a measure of the range through which the trace has been shifted.

In one form, apparatus according to the invention can be adapted to measure the duration of a periodically recurring phenomenon in terms of the periodic time of said phenomenon, the apparatus in this case preferably comprising a cathode ray oscillograph, and means for controlling the deflection of the cathode ray in the oscillograph in one coordinate direction in accordance with the amplitude of an electric signal corresponding to said phenomenon, means for controlling the deflection of said cathode ray in the other co-ordinate direction in accordance with a deflecting amplitude of saw tooth wave form and having periodic time which is in simple ratio to that of said phenomenon, two terminals so arranged that potentials applied to them are effective to control the region through which said cathode ray is deflected in response to said saw-tooth wave form, means for applying a bias to one of said terminals, and means for applying a variable bias to the other of said terminals in accordance with the setting of a calibrated control, which is so arranged that the limiting values of said variable bias can be so determined that the cathode ray trace crosses a fixed reference line in both limiting positions of the control, whereby the setting of said control can be made directly indicative of a time corresponding to a part of the time represented by the phase interval of the signal at the two points of the oscillograph trace which cross said reference line when said control is in its respective limiting positions.

In another aspect, the invention may be regarded as providing a method of measuring a potential or current comprising applying said potential or current to a cathode ray oscillograph in such manner as to deflect the cathode ray therein by an amount corresponding to said potential or current, applying a bias to the deflecting means in said oscillograph in such manner as to cause said ray to become deflected in its initial position and measuring said bias to afford an indication of the value of said current or potential. Thus, for example, apparatus according to the invention for measuring electric potential may include a cathode ray oscillograph and two terminals so arranged that the potential difference between them controls the deflection of the cathode ray in said oscillograph in one plane, means being provided for applying an unknown potential to be measured between one of said terminals and a point of fixed or reference potential to cause said ray to be deflected and means for developing and applying a bias potential between the other of said terminals and said point of fixed or reference potential for the purpose of restoring said ray to its original position, and means for measuring said bias potential to afford an indication of the value of said unknown potential. Preferably in this case the apparatus is electrically connected to said point of fixed potential at one point only and said bias potential is developed in the connecting means between the apparatus and said point of fixed potential in such manner that the effective value of said unknown potential with reference to the apparatus depends on the value of said bias potential.

The value of the bias potential can be measured by a meter arranged in a suitable manner.

Figure 3:
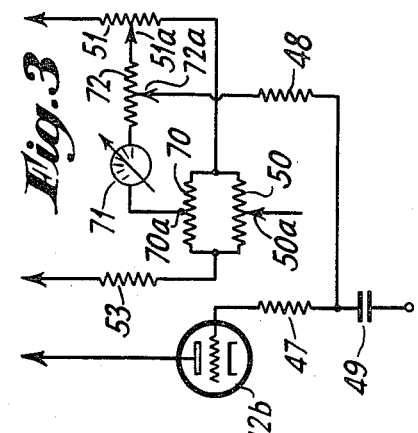
Figure 2:
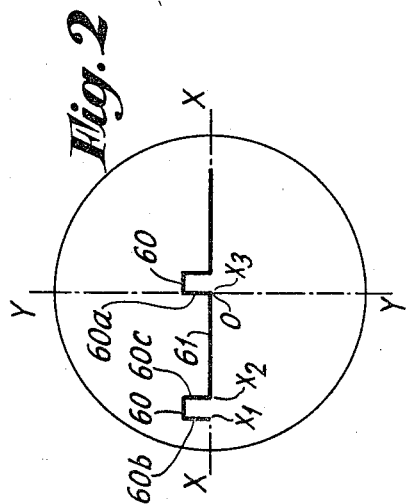

The nature of the invention and the method of carrying the invention into practice will be fully understood from the following description with reference to the accompanying drawing in which:

Figure 1 is a circuit diagram of an arrangement used for monitoring purposes in a television system the arrangement including two arrangements according to the invention associated with means for controlling the horizontal and vertical deflection respectively of a cathode ray in a cathode ray oscillograph, Figure 2 is a diagram representative of the appearance of the trace corresponding to synchronising impulses as seen on the screen of the cathode ray tube in the arrangement of Figure 1, and Figure 3 is a diagram showing a possible modification of part of the arrangement shown in Figure 1.

Referring to Figure 1 of the drawing, it will be seen that the arrangement therein shown comprises a cathode ray tube of which, in Figure 1, only the terminals leading to the deflection plates X and Y are shown for convenience in drawing, the plates X being arranged so that potentials applied thereto control the deflection of the cathode ray in a horizontal direction while potentials applied to plates Y control the deflection of the ray in the vertical direction. The plates X and Y are represented as widely separated but it will be appreciated that they are in fact assembled in an envelope of customary form together with the usual cathode ray gun and screen, suitable energising means being provided for these elements in a manner well-understood in the art and not requiring further explanation here. The screen of the tube including plates X and Y is shown in Figure 2, wherein the axes X and Y indicate the direction in which the cathode ray beam is deflected in response to signals applied to the X plates and the Y plates respectively.

Each of the plates Y is connected to an anode of a pair of thermionic amplifying valves 2 comprising valves 2a and 2b connected in push-pull relation, the anode of each of the valves 2 being connected through resistances 3a and 3b to a suitable high tension source of which the positive pole is indicated by the + sign to the right of the drawing. The cathode of each valve 2 is connected to the negative pole of the high tension source indicated by the — sign to the right of the drawing, through resistance 4a and part of resistance 4b and through the resistance 5 which is common to both cathodes and is connected to an adjustable tapping 4c on resistor 4b.

There is an adjustable resistance 4d connected in parallel with resistance 4b.

A signal on which measurements are to be made or which is to be observed is applied between a pair of terminals 6 of which the uppermost is connected to the control grid of the valve 2a and the lowermost is earthed and a bias potential is likewise applied between the control grid of the valve 2b and earth, as will more fully appear from the following description.

The valves 2 are shown as being screen grid pentodes screen potential for each valve being obtained from the high tension lead through a resistor 7. The suppressor grids of each valve 2 are each connected to the respective cathode through a resistance 8 and earthed in respect of high frequency currents through condensers 9.

Suitable grid leak resistances 10 having associated bye-pass condensers 10a are provided in the grid leads of valves 2.

Bias potential for the control grid of the valve 2b is derived from a connection between resistances 11 and 12, which are arranged in parallel with resistance 13, the combination of resistances in parallel being arranged in series with resistance 14 across the high tension source. Between the junction of resistances 11 and 12 and a slider 13a on potentiometer 13, is arranged a direct current meter 15, preferably a milliammeter or microammeter, having connected with it a tapped resistance 16 through any of the tappings on which the righthand side of the meter and the slider 13a can be connected to earth on slider 17.

It will be seen that the circuit including the pair of valves 2 and resistors 3a, 3b, 4a, 4b, 4d and 5 constitutes an amplifier of the kind described in British patent specification No. 482,740, the particular arrangement used in the present case corresponding to the arrangement shown on the right-hand side of Figure 1 of the prior specification except that in the present case a $\pi$-connection of resistances constituted by resistances 4d and the two parts of resistance 4b on either side of tapping 4c is introduced. As explained in the prior case, the pair of resistances 4a serves to straighten the characteristic curves of the valves 2 when potentials in both push-pull and push-push relation are applied to the respective control electrodes, by providing negative feedback, while the common cathode resistance 5 is effective to introduce feedback when potentials are applied in push-push relation so that the amplifier is rendered relatively insensitive in respect of push-push signals. By varying the value of resistance 4d, which is preferably calibrated, the gain of the amplifier with respect to push-pull signals can be varied, and any mis-match of the valves 2 can be taken up by adjustment of tap 4c on resistance 4b.

It will be observed that between the pairs of resistances 3a and 3b there is connected a resistance 20, on which a lead 21 is adjustably tapped at tapping 20a, this lead 21 being connected to the input of an amplifier valve 22, shown as a triode. This valve is arranged in a buffer or amplifier stage which may be of any well-known type suitable for the purpose, including, for example, elements such as those represented enclosed in the dotted rectangle 23, these elements not being further referred to in detail herein as their arrangement and function is well-understood by those skilled in the art.

The output of valve 22 is coupled through lead 24 to the input of a further valve 25, shown as a screen-grid pentode, which is arranged in a blocking oscillator circuit, in which a potential of saw tooth wave form is developed in the output. Any suitable blocking oscillator arrangement may be used in association with the valve 25, provided the arrangement operates to give a good rectilinear slow stroke in the saw-tooth. By way of example, a specific form is illustrated in the drawing and described herein. The input circuit of the valve 25 includes resistance 26 and parallel condenser 27, together with a variable condenser 28, and the secondary winding of transformer 29. The condenser 28 is connected through the aforesaid secondary winding and a resistance 30 to tapping 31a on a potentiometer 31 in such manner that charging current of a magnitude determined by the setting of tapping 31a can be supplied to condenser 28.

The output circuit of valve 25 includes a variable condenser 32 connected between the anode and cathode of the valve, the anode of the valve being also connected to the tapping 31a through resistance 33 in such manner that charging current will be supplied to the condenser 32 from the positive high tension supply lead as is the case of condenser 28. The controls for condensers 28 and 32 are preferably ganged as indicated by the dotted line 34.

A reaction circuit for the oscillator is afforded by a connection between the end of potentiometer 31, through resistance 35, the primary winding of transformer 29 and the screen grid of valve 25, which is a screen grid pentode valve having its suppressor grid connected to its cathode as conventionally represented in the drawing, the cathode of the valve being connected to the negative pole of the high tension source as shown.

The oscillator circuit operates as follows, condensers 28 and 32 and associated resistances 39 and 33 respectively, are of such magnitudes that the condensers will charge to such potentials as to cause the grid and anode electrodes of valve 25 to operate substantially in unison. The condenser 32 must be of relatively large capacity and the charging resistance 33 high enough so that the charging current for the condenser is substantially constant over the ranges of potential difference occurring between the plates.

Thus, assuming that condenser 32 is initially uncharged, then the potential on the upper or positive plate of the condenser will rise steadily until the anode of valve 25 becomes sufficiently positive to render valve 25 conductive. At the same time it is arranged that when the valve becomes conductive, the positive plate of condenser 28 has acquired such a potential that the control grid of valve 25, as well as the anode thereof, draws current. Condenser 32 will thus discharge through the valve 25 and at the same time an intense current pulse will pass through the screen grid of valve 25, primary winding of transformer 29, resistance 35 and potentiometer 31, the effect of this pulse being to develop such an E. M. F. in the secondary winding of transformer 29 that condenser 28 becomes negatively charged and the valve 25 becomes blocked at the grid. The cycle of operations then recommences. Thus, there will be developed between the plates of condenser 32 a potential of substantially sawtooth wave form with a long flank corresponding to the slow stroke of the saw tooth occurring in the period for which condenser 32 is charging and a short flank or return stroke occurring while the valve 25 is conductive.

Control pulses are applied to the oscillator through the amplifier or buffer stage 23 in such manner that the oscillator valve 25 is triggered into conductive condition slightly in advance of the time at which it would be triggered naturally, the arrangement preferably being such that this forced triggering takes place at the end of alternate signal cycles.

By setting the capacities of condenser 28 and 32 the period of the oscillator may be adjusted.

The condenser 32 is connected in the input of an amplifier including a pair of valves 42 including valves 42a and 42b arranged in a manner similar to the valves 2 and having the deflection plates X connected with their anodes. The valves 42 are shown as triode valves, as such valves are generally satisfactory having regard to the fact that the amplifier including these valves is only required to handle the standardised saw tooth input provided across condenser 32.

The arrangement comprising resistances 44a, 44b, 44d and 45 is exactly similar to the arrangement including the correspondingly referenced resistances 4a, 4b, 4d and 5 described in connection with valves 2.

The upper, or positive plate of condenser 32 is connected to the control grid of valve 42a through a blocking condenser 46, and leakage resistances 47 and 48 are shown in association with the grid of each valve 42, there being a smoothing condenser 49 inserted between the junction of the resistances 47 and 48 and the negative supply lead, whilst the end of resistance 48 is connected to a tapping 50a or 51a, as the case may be, on potentiometer 50 and 51 respectively, the latter potentiometers being included in an arrangement generally similar in nature to but somewhat differing in function from the network including resistances 11, 12 and 13 associated with valves 2.

The potentiometer 50 is connected at both ends to a further potentiometer 52 of which the slider 52a is connected through a resistance 53 to the high tension supply lead, one end, shown as the lower end, of the pair of potentiometers 50 and 52 being connected to the mid-point of a resistance 54 arranged in parallel with potentiometer 51.

Resistance 53 is preferably of a high value relative to potentiometers 50 and 52 to prevent a large current drain arising when slider 52a is at its lowermost setting and so affecting the potential of slider 51a by a change of current in resistances 54a and 56.

Resistance 54 is connected to the positive and negative supply lead respectively through resistances 55 and 56 which serve to determine the limits of the potential obtainable by adjusting slider 51a on potentiometer 51.

The arrangement represented in Figure 1 provides both for the measurement of the voltage or amplitude of an observed signal and for the estimation of the duration of parts of the signal with reference to the whole.

Thus, for example, in the case of television synchronising signals of the kind represented in the trace 61 shown as appearing on the screen of the cathode ray tube 1 in Figure 2 and consisting of a series of square topped pulses 60 following each other at intervals, it is desirable to measure the extent of each pulse in the Y or vertical direction to afford an indication of the peak voltage of the pulse, and it is also required to ascertain the duration of each pulse as a percentage of each signal cycle, in order to ascertain that the occurrence of the synchronising pulses will not, for example, interfere with the proper transmission of picture signals. That is to say, referring to Figure 2, it is desired to compare the times represented by the distances $x_1x_2$ and $x_1x_3$ respectively.

For the purpose of effecting the measurements indicated, the signals to be observed are applied to the terminals 6 and the timing circuits associated with the tube 25 are adjusted to give a cyclic variation corresponding to the signal cycle, the period of the saw tooth waveform generated being preferably twice, or some other simple multiple, of that of the signal cycle, so that the trace 61 appears as shown in Figure 2.

The axes X—X and Y—Y shown in Figure 2 are preferably physically represented by cursors or by other suitable indicating devices, the cursor for indicating the line X—X preferably being adjustable.

The principle from which the foregoing arrangement has been developed is that if an unknown potential is applied to one of the pairs of plates of X or Y to set up a deflection of the cathode ray, then an equal potential applied to the opposite plate of the pairs X or Y as the case may be will cause the cathode ray beam to be restored to its original position, thus if the second applied potential required to restore the cathode ray beam to initial condition is measured, a measure of the unknown potential is given.

Thus, again referring to Figure 1, a voltage applied between the input terminals 6 can be measured by measuring a potential applied to the control grid of the valve 2b to balance the effect of the unknown potential.

However, in the arrangement shown in Figure 1, instead of varying the bias on the grid of valve 2b with respect to the cathode thereof, a substantially fixed bias is developed between the control grid of valve 2b and its cathode due to the connection of the control grid of the valve 2b through resistance 10 to the junction of resistances 11 and 12 which, with resistance 14, are connected across the power supply leads, and the potentials of the whole arrangement are effectively varied with reference to the signal potential applied between terminals 6 by varying the position of slider 13a on potentiometer 13.

Thus it will be observed that slider 13a is connected to earth through the appropriate tapping on resistance 16 and slider 17, this earth connection being the only one made in the whole of the arrangement, preferably including also the power supply arrangements (not shown) for the cathode ray tube 1 within which the plates X and Y are included.

It will be seen that by adjusting slider 13a, the potential of the arrangement is caused to move with reference to earth so that the potential of the cathodes of the valves 2 move correspondingly whereby the effective value with reference to the cathodes of valves 2 of the voltage applied at terminals 6 with reference to earth can be caused to vary in dependence on the position of slider 13a. Thus the effect of signal potential on the control grid of valve 2a can be neutralised by corresponding adjustment of slider 13a, provided the signal potential does not exceed the range available on potentiometer 13. The current flowing through meter 15 and resistance 16 will determine the potential between the junction of resistances 11 and 12 and slider 13a, and the maximum range of meter 15 will be determined by the limits of this potential. However the potential between the junction of resistances 11 and 12 and earth will depend on the current in resistance 16 and the setting of slider 17 so that the effective range of meter 15 is determined by the setting of slider 17. The meter 15 is preferably calibrated to indicate the potential between the junction of resistances 11 and 12 directly.

Before effecting a desired potential measurement, first the controls for the valves 2 are set in the following way:

The arrangement is operated with the input terminals 6 connected to earth and the tapping 13a is adjusted till meter 15 indicates zero current through resistance 16. In this condition the control grids of both valves 2 are at earth potential and the deflection of the cathode ray under the control of the saw tooth potentials applied to the X plates then appears as a horizontal straight line. The slider 4c in resistance 4b is then set to such a position that the adjustment of the value of resistance 4d does not produce any movement of the oscillograph trace, whereupon the tubes 2 are correctly balanced. The cursor X—X, by which the position of the X axis is indicated is then set to the line on which the cathode ray trace appears, and will represent zero amplitude or potential in the applied signal.

With the measuring arrangement so far described, the advantage is secured that large signal potentials can be measured without there being any risk of the control grids of valves 2 acquiring, in their finally adjusted condition, such a potential that the control grids will be at about the same potential as the screen grids or anodes of the valves. Thus the desired voltage measurement is always performed with the valves 2 operating in sensitive condition and without overload. Moreover, when readings are to be taken by reference to the oscillograph trace 61 the cathode ray is subject to practically negligible defocusing due to the applied signal potential.

Thus assume it is required to measure the peak potentials of the pulses 60 of Figure 2. Then the position of the slider 13a is adjusted to move the trace 61 from the position shown in the drawing until the tops of the pulses 60, instead of the datum level 61, as shown, coincide with the cursor X—X of Figure 2, which, as already, indicated is marked or otherwise indicated on the screen of tube 1. Then the difference in the readings of meter 15 before and after adjustment gives a direct reading of the desired potential. (It is, of course, assumed that the slider 17 is so situated that the meter 15 is not operated to the full extent of its range while the adjustment is in progress.)

The arrangement so far described can also be readily used for measuring the alternating current potential developed across a push-pull circuit. In this case the following method of procedure is recommended.

First the input terminals 6 are earthed and the apparatus calibrated with the slider 17 in such position that meter 15 will have a satisfactory range of operation by observing the variation of cathode ray deflection in the Y direction (vertically as seen in Figure 2) with voltmeter readings in that range. One side of the push-pull circuit across which the alternating current voltage is to be measured is then connected to the input terminals 6 and while the timing circuits associated with valve 25 are adjusted to correspond with the periodicity of said voltage so that a steady trace appears on the end of the tube. The slider 13a is then moved until the said trace falls conveniently on the screen. This ensures that the anode voltages for the valves 2 are high enough relative to earth to allow for any D. C. potentials occurring in the circuit to be investigated, so that the tubes 2 will not be operated under overload conditions. The grid of right hand valve 2 is then disconnected from the junction of resistors 11 and 12, and connected to the other side of the push-pull circuit across which the voltage is to be measured. Thereupon the whole push-pull signal can be observed on the precalibrated oscillograph and the required voltage read directly on the pre-calibrated screen.

As already referred to above, the arrangement of Figure 1 includes a further application of the invention in connection with the X deflection plates of the tube 1. For this purpose the valve 42b has associated with it an arrangement including potentiometers and resistances 50 to 54.

In this arrangement the setting of the slider 51a on the potentiometer 51 determines the bias applied to the control grid of the valve 42b while a bias determined by the settings of sliders 50a and 52a is applied to the control grid of the valve 42a. As mentioned above, resistance 53 is so high that even with slider 52a at its lowermost setting the short-circuit effect on the combination of resistances 51 and 54 is negligible. Resistance 54 provides a connection at its mid point 54a for the ends of potentiometers 50 and 52 such that these ends are maintained substantially at a potential corresponding to that of the mid-point of potentiometer 51a, so that the control grid of the valve 42b can be adjusted above or below the bias on the grid of the valve 42a. Thus with slider 50a in its most negative position, the trace such as 61, on the oscillograph screen can be made to move to the left or to the right of the central position by suitably actuating slider 51a.

The arrangement including potentiometers and resistances 50 to 54 provides for the measurement of the duration of pulses such as 60 of Figure 2, as a fraction of the duration of each of the cycles represented in trace 61. This measurement is carried out in the following way:

First the balance of the tubes 42 is checked, and if necessary corrected. This is done by first setting the resistance 44d to its minimum value so that the gain of valves 42 in respect to signals applied to the control grid of tube 42a is a maximum. The amplitude of the sawtooth potential developed between the X plates of tube 1 will then be a maximum. Sliders 50a or 51a are then adjusted till the part of the trace 61 at the centre, that is in the case shown in Figure 2, the vertical flank 60a, is in register with the fixed cursor Y—Y, which is preferably arranged to pass vertically through the axis of the tube 1 as represented in Figure 2. (It will be seen from Figure 1 that the position of slides 50a and 51a respectively determine the bias potentials on the control grids of the left and right-hand tubes 42 respectively.) The resistance 44d is then adjusted to its minimum value and if there is any shift of the flank 60a away from the central line Y—Y, the slider 44c is adjusted till the shift is eliminated. The valves 42 are then not necessarily accurately balanced, but will, in general operate satisfactory for the purpose in hand.

After the balance of the valves 42 has been adjusted measurement of the duration of a pulse 60 is carried out in the following way:

The slider 50a is adjusted to its most negative position so that the potential of the control grid of the valve 42a is made equal to that of the point 54a. The slider 51a is then adjusted to vary the potential of the control grid of the valve 42b in such manner that the trace on the screen of tube 1 appears with the edge 60a of the second pulse 60 (see Figure 2) in register with the line Y—Y.

The slider 50a is then adjusted to its uppermost position thereby causing the control grid of the valve 42a to become more positive with respect to the control grid of the valve 42b, s that the left hand plate X becomes more negative with respect to its right hand plate X and the trace 61 on the screen of tube 1 moves to the right. Slider 52a is adjusted so that the edge 60b (see Figure 2) of the first or left-hand puls 60 is in line with the line Y—Y. With the slider 51a and 52a set in the manner described it will be appreciated that by movement of the slide: 50a throughout its range of adjustment the trace 61 can be moved across the screen of tube 1, a distance corresponding to the duration of a single cycle of the signals under observation.

Thus by suitably graduating a scale associated with slider 50a, the duration of the first short pulse 60 in Figure 2 can be read off directly as a fraction, for example, a percentage of the duration of a cycle on the scale of slider 50a by observing the position of slider 50a at which the right hand edge 60c of the said pulse coincides with the line Y—Y.

Various modifications of the arrangement shown in Figure 1 are possible. For example it will be readily appreciated that in connecting the end of resistance 53 remote from slider 52a to the negative supply lead instead of to the positive supply lead as shown the arrangement including potentiometers 50 and 52 would be operative to apply a negative potential to the control grid of left-hand tube 42 with respect to the potential applied to right-hand control grid.

Moreover, if desired, instead of using potentiometer 50 as the graduated potentiometer as above described, potentiometer 52 could be used for this purpose, slider 51a then being set with slider 52a adjusted to its lowest position and slider 50a being set with slider 52a in its uppermost position. In this case the movement of slider 52a would not be strictly linearly related to the shift of the trace 61 produced, but as, with this arrangement, the currents through potentiometers 50 and 52 would be varied when the slider 52a is moved, a current meter might be arranged in series with potentiometers 52 or 50a or in the connection from the ends of those potentiometers to the point 54a to give an indication of the shift of the trace and the meter could be calibrated in terms of percentages of the duration of a signal cycle. However, if a meter is used, an arrangement in which the meter reading varies substantially linearly with the bias potential to be measured is to be preferred, such an arrangement being shown in Figure 3 of the drawing.

In Figure 3 an arrangement is shown which corresponds to the arrangement including potentiometers 50 to 52 and resistances 53 and 54 of Figure 1, like parts in both figures being indicated by like reference numerals and only those elements being represented in Figure 3 as are necessary to show the changes made with respect to the arrangement of Figure 1.

Thus, in Figure 3, the potentiometer 52 is replaced by a fixed resistance 70, to a fixed tapping 70a, on which one terminal of current indicating meter 71 is connected. The tapping 70a may conveniently be at the mid-point of resistance 70, as shown in the drawing. The other terminal of meter 71 is connected in series with potentiometer resistance 72 having slider 72a, to the slider 51a of potentiometer 51. The control grid of valve 42b is connected to the ier 72a and resistance 54 is omitted, the lead m the lower ends of potentiometer 50 and retance 70 being taken to the lower end of potiometer 51. The value of resistance 72 must high enough not to produce any serious short cuit effect on resistance 70 so that the po-itial at point 71 with respect to the power ply system may be regarded as substantially istant.

The arrangement of Figure 3 can be used in following way:

Slider 51a is adjusted till the meter reads zero rent. Slider 50a is then adjusted so that the ired part of the trace 61 (see Figure 2), for mple, the edge 60a, falls on the line Y—Y. e slider 51a is then moved up or down till meter reading is a maximum, the trace 61 ng then moved to the left or to the right on end of tube 1 in accordance with the direcn of movement of slider 51a. The slider 72a then adjusted to vary the bias on the control d of valve 42b so as to bring the repetition nt such as 60b of Figure 2 in register with line Y—Y. With the arrangement set in manner described, if the meter 71 is cali-ted in percentages, the duration represented lengths such as $x_1x_2$ on the trace 61 may be d directly as a percentage of a cycle by obving the change in the reading of the meter en slider 51a is actuated to cause the trace to shift to the desired extent.

n operating the arrangements described above resistances 4d and 44d will generally be adted so that the gain of the corresponding plifier 2 or 42 as the case may be has such alue that the amplifiers do not become overded when the trace has been moved off the tral position during a measurement, but, subt to this limitation, the gain of the amplifiers preferably made as large as possible to give highest degree of accuracy in measurement. ferably the resistances 4d and 44d are made iable in steps so that any meters such as ter 15 of Figure 1 can be calibrated to read tage directly for any particular setting of the istance 4d or 44d as the case may be.

A further application of the arrangement acding to the invention is to the measurement rates of change of potential in different parts a pulse. Thus, if the frequency of a pulse i hence the periodic time of a pulse is known, arrangement shown in Figure 1 enables the ential change during a certain percentage of cycle, i. e. during a particular part of the iodic time, to be measured, so that, for exple, the slope of an edge such as 60a or 60c a pulse 60 (see Figure 2) can be measured. this purpose the resistance 44d should be so that the valves 42 operated with a high n sufficient to expand the representation of pulse such as 60 appearing in the trace 61 such an extent that the edge 60a or 60c to investigated no longer appears substantially tical as shown in the drawing but appears as ing a finite slope which can be measured.

Furthermore, the arrangement may also be d to indicate actual durations of pulses. us, if the frequency of the saw tooth oscil-on generator is known, for example, from a liminary calibration, the periodic time corrending to the length $x_1x_3$ of Figure 2 will half that of the periodic time of the saw-th oscillation generator, so that the first menied periodic time can be determined and acdingly the actual duration of a pulse, represented by the length $x_1x_2$ in Figure 2, can be estimated.

While the invention has been described primarily in connection with a cathode ray oscillograph in which the cathode ray is deflected by applying deflecting potentials to suitably arranged deflecting plates, it will be fully realised that the invention is applicable to arrangements in which deflection of a cathode ray is effected under the control of currents which circulate in deflecting coils to produce magnetic field by which the cathode ray is deflected. The invention may thus be used for investigating and measuring currents in a manner similar to that in which it is used in connection with the investigation and measurement of unknown potentials.

We claim:

1. Apparatus for measuring electrical potentials comprising a cathode ray tube, wherein a beam of electrons impacts upon a luminescent screen, a first deflecting means for producing a deflection of said beam along a predetermined path, a second deflecting means for deflecting the beam at right angles to said predetermined path, a sawtooth wave oscillator, a first negative feedback push-pull amplifier having an input circuit and an output circuit, means to supply energy from the saw-tooth wave oscillator to the input circuit of said push-pull amplifier, means to supply the first named deflecting means with energy from the output circuit of said first push-pull amplifier, calibrated biasing means for adjusting the sensitivity of said first push-pull amplifier, a second negative feedback push-pull amplifier having an input circuit and an output circuit, means to supply electrical potentials to be measured to the input circuit of said amplifier, means to supply energy from the output circuit of said second amplifier to said second named deflecting means, and calibrated biasing means for adjusting the sensitivity of said second named amplifier.

2. Apparatus as claimed in claim 1 and comprising, in addition, means to supply synchronizing energy from the output circuit of said second amplifier to said saw-tooth wave oscillator.

3. The method of measuring a periodic electrical signal which comprises the steps of producing a beam of electrons, impacting the beam of electrons upon a luminescent screen, supplying the periodic electrical signal to be measured, producing a deflection of the beam of electrons under the control of the supplied signal whereby a luminous trace representative of said signal is produced upon said screen, supplying a datum line indicium in register with said screen, producing coincidence of a predetermined portion of the luminous trace with the datum line by supplying a constant deflection force to said beam, and measuring said deflection force.

4. The method of measuring a periodic electrical signal which comprises the steps of producing a beam of electrons, impacting the beam of electrons upon a luminescent screen, supplying the periodic electrical signal to be measured, producing a deflection of the beam of electrons under the control of the supplied signal whereby a luminous trace representative of said signal is produced upon said screen, supplying a datum line indicium in register with said screen, shifting the luminous trace to produce coincidence of a predetermined portion of the luminous trace with the datum line by supplying a constant force to said beam, and translating the shift into potential units.

5. Apparatus for measuring periodic electrical potentials comprising a cathode ray tube wherein a beam of electrons impacts upon a luminescent screen, independent means to deflect the beam in two mutually perpendicular directions across said screen, a datum line indicium in register with said screen, a sawtooth wave oscillator, means including connections from said sawtooth oscillator to one of said independent means to produce a linear trace on said screen, means to supply the potential to be measured to the other of said independent means, means including a constant potential to bring into coincidence the datum line with a predetermined portion of the trace due to the combined action of the independent means, and means to measure the magnitude of the constant potential.

6. Apparatus for measuring periodic electrical potentials comprising a cathode ray tube wherein a beam of electrons impacts upon a luminescent screen, independent means to deflect the beam in two mutually perpendicular directions across said screen, a datum line indicium in register with said screen, a sawtooth wave oscillator, means including connections from said sawtooth oscillator to one of said independent means to produce a linear trace on said screen, means to supply the potential to be measured to the other of said independent means, means to produce coincidence of the datum line with a predetermined portion of the trace due to the combined action of the two independent means by introducing a constant potential of opposite polarity to that of the supplied potential to said other independent means, and means to measure the magnitude of said introduced constant potential.

7. Apparatus for measuring periodic electrical potentials comprising a cathode ray tube wherein a beam of electrons impacts upon a luminescent screen, independent means to deflect the beam in two mutually perpendicular directions across said screen, a datum line indicium in register with said screen, a sawtooth wave oscillator, means including connections from said sawtooth oscillator to one of said independent means to produce a linear trace on said screen, means to supply the potential to be measured to the other of said independent means, means to produce coincidence of the datum line with a predetermined portion of the trace due to the combined action of the two independent means by supplying a biasing deflection to said beam, and means to measure the biasing deflection.

8. Apparatus for measuring a cyclically varying potential comprising a cathode ray oscilloscope provided with a viewing screen, means for applying said potential to be measured to said oscilloscope, means for producing a luminous trace on said viewing screen under the control of the potential to be measured, the amplitude of said trace being proportional to the magnitude of said potential, a datum line indicium in register with the screen of said oscilloscope, means including a source of saw tooth wave energy to produce a trace at right angles to said first named trace whereby the combined trace is representative of the wave form of the cyclically varying potential, control means to make one predetermined portion of the combined trace coincide with said datum line indicium, further control means to make another predetermined portion of said combined trace coincide with said datum line indicium, and measuring scales to translate the produced coincidences into parameters of said cyclically varying potential.

CECIL OSWALD BROWNE.
ALAN DOWER BLUMLEIN.
JOHN HARDWICK.